US012050830B2

(12) United States Patent
Zandifar et al.

(10) Patent No.: US 12,050,830 B2
(45) Date of Patent: Jul. 30, 2024

(54) CONTENT-AWARE PQ RANGE ANALYZER AND TONE MAPPING IN LIVE FEEDS

(71) Applicant: Dolby Laboratories Licensing Corporation, San Francisco, CA (US)

(72) Inventors: Ali Zandifar, Los Angeles, CA (US); James E. Crenshaw, Burbank, CA (US); Cristina Michel Vasco, Austin, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 259 days.

(21) Appl. No.: 17/606,433

(22) PCT Filed: Apr. 20, 2020

(86) PCT No.: PCT/US2020/029023
§ 371 (c)(1),
(2) Date: Oct. 25, 2021

(87) PCT Pub. No.: WO2020/219401
PCT Pub. Date: Oct. 29, 2020

(65) Prior Publication Data
US 2022/0180635 A1  Jun. 9, 2022

Related U.S. Application Data

(60) Provisional application No. 62/838,518, filed on Apr. 25, 2019.

(30) Foreign Application Priority Data

Apr. 25, 2019  (EP) ..................................... 19171057

(51) Int. Cl.
*G06T 7/11* (2017.01)
*G06F 3/14* (2006.01)
(Continued)

(52) U.S. Cl.
CPC .................. *G06F 3/14* (2013.01); *G06T 5/92* (2024.01); *G06T 7/11* (2017.01); *G06V 20/41* (2022.01);
(Continued)

(58) Field of Classification Search
CPC . G06T 5/009; G06T 7/11; G06T 2207/10016; G06T 2207/20021;
(Continued)

(56) References Cited

U.S. PATENT DOCUMENTS 9,020,263 B2  4/2015  Dunlop
9,405,976 B2  8/2016  Dunlop
(Continued)

FOREIGN PATENT DOCUMENTS

AU  2014277652 A1  6/2016
CN  107211076 A  10/2018
CN  108141599 A  1/2022

OTHER PUBLICATIONS

Etsi: HOR Signalling and Carriage of Dynamic Metadata for Colour Volume Transform; Application #1 for DVB compliant systems Technical Specification Mar. 1, 2018 (Mar. 1, 2018), pp. 2018-3.
(Continued)

*Primary Examiner* — Solomon G Bezuayehu

(57) ABSTRACT

In image processing system comprises an input configured to receive an image signal, the image signal including a plurality of frames of image data; and a processor configured to automatically determine an image classification based on at least one frame of the plurality of frames, and dynamically generate a mapping metadata based on the image classification. The processor includes determination circuitry configured to determine a content type for the image signal; segmentation circuitry configured to segment the image data into a plurality of feature item regions, based on the content
(Continued)

type; extraction circuitry configured to extract at least one image aspect value for respective ones of the plurality of feature item regions.

18 Claims, 7 Drawing Sheets

(51) Int. Cl.
| | |
|---|---|
| G06T 5/92 | (2024.01) |
| G06V 20/40 | (2022.01) |
| G06V 20/70 | (2022.01) |
| H04N 7/01 | (2006.01) |
| H04N 19/46 | (2014.01) |
| G06V 10/26 | (2022.01) |

(52) U.S. Cl.
CPC ............. *G06V 20/46* (2022.01); *G06V 20/70* (2022.01); *H04N 7/01* (2013.01); *H04N 19/46* (2014.11); *G06T 2207/10016* (2013.01); *G06T 2207/20021* (2013.01); *G06T 2207/20208* (2013.01); *G06V 10/26* (2022.01); *G06V 20/49* (2022.01); *G06V 2201/10* (2022.01)

(58) Field of Classification Search
CPC .......... G06T 2207/20208; G06V 20/41; G06V 20/46; G06V 20/70; G06V 10/26; G06V 20/49; G06V 2201/10; H04N 19/46
See application file for complete search history.

(56) References Cited

U.S. PATENT DOCUMENTS

| | | |
|---|---|---|
| 9,711,182 B2 | 7/2017 | Dharssi |
| 9,805,270 B2 | 10/2017 | Carlson |
| 9,836,819 B1 | 12/2017 | Donsbach |
| 9,852,499 B2 | 12/2017 | Ming |
| 9,961,237 B2 | 5/2018 | Atkins |
| 10,091,479 B2 | 10/2018 | Barron |
| 10,778,983 B2 | 9/2020 | Chen |
| 2013/0148029 A1 | 6/2013 | Gish |
| 2013/0259375 A1 | 10/2013 | Dunlop |
| 2014/0321746 A9 | 10/2014 | Dunlop |
| 2016/0035100 A1* | 2/2016 | Bamford ................ G06T 7/11 382/131 |
| 2017/0127126 A1* | 5/2017 | Strein .................... H04N 21/44 |
| 2017/0161881 A1* | 6/2017 | Najaf-Zadeh ........ H04N 19/597 |
| 2017/0262984 A1* | 9/2017 | Barnes ................ G06V 20/698 |
| 2018/0013927 A1* | 1/2018 | Atkins .................... G09G 5/02 |
| 2018/0189951 A1* | 7/2018 | Liston .................... G06T 7/194 |
| 2018/0295375 A1 | 10/2018 | Ratner |
| 2018/0308269 A1 | 10/2018 | Baran |
| 2018/0315193 A1* | 11/2018 | Paschalakis .............. G06T 7/11 |
| 2019/0058886 A1* | 2/2019 | Chen .................... H04N 19/30 |
| 2020/0012862 A1* | 1/2020 | Mitra .................... G06V 20/46 |

OTHER PUBLICATIONS

ITU-R BT. 2100-1 (Jun. 2017), "Image parameter values for high dynamic range television for use in production and international programme exchange."

Pratikakis Ioannis et al: "Semantics Extraction from Images", Dec. 31, 2011 (Dec. 31, 2011), International Conference on Financial Cryptography and Data Security; [Lecture Notes in Computer Science; Lect.Notes Computer], Springer, Berlin, Heidelberg, pp. 50-88, vol. 6050, pp. 50-88, vol. 6050, pp. 50-88.

Tran, D. et al., "Learning spatiotemporal features with 3d convolutional networks," the IEEE International Conference on Computer Vision (ICCV), 2015, pp. 4489-4497.

Ultra Hd Forum: "Ultra HD Forum Phase B Guidelines", Apr. 6, 2018 (Apr. 6, 2018), XP055616175, https://ultrahdforum.org/resources/phaseb-guidelines-description/ Retrieved from the Internet: URL:https://ultrahdforum.org/wp-content/up loads/Ultra-HD-Forum-Phase-B- pp. 14-18.

Zhang, K. et al., "Joint face detection and alignment using multitask cascaded convolutional networks," IEEE Signal Processing Letters 23.10, 2016, pp. 1499-1503.

Zhao, H. et al."ICNet for Real-Time Semantic Segmentation on High-Resolution Images" Computer Vision and Pattern Recognition, Aug. 2018.

* cited by examiner

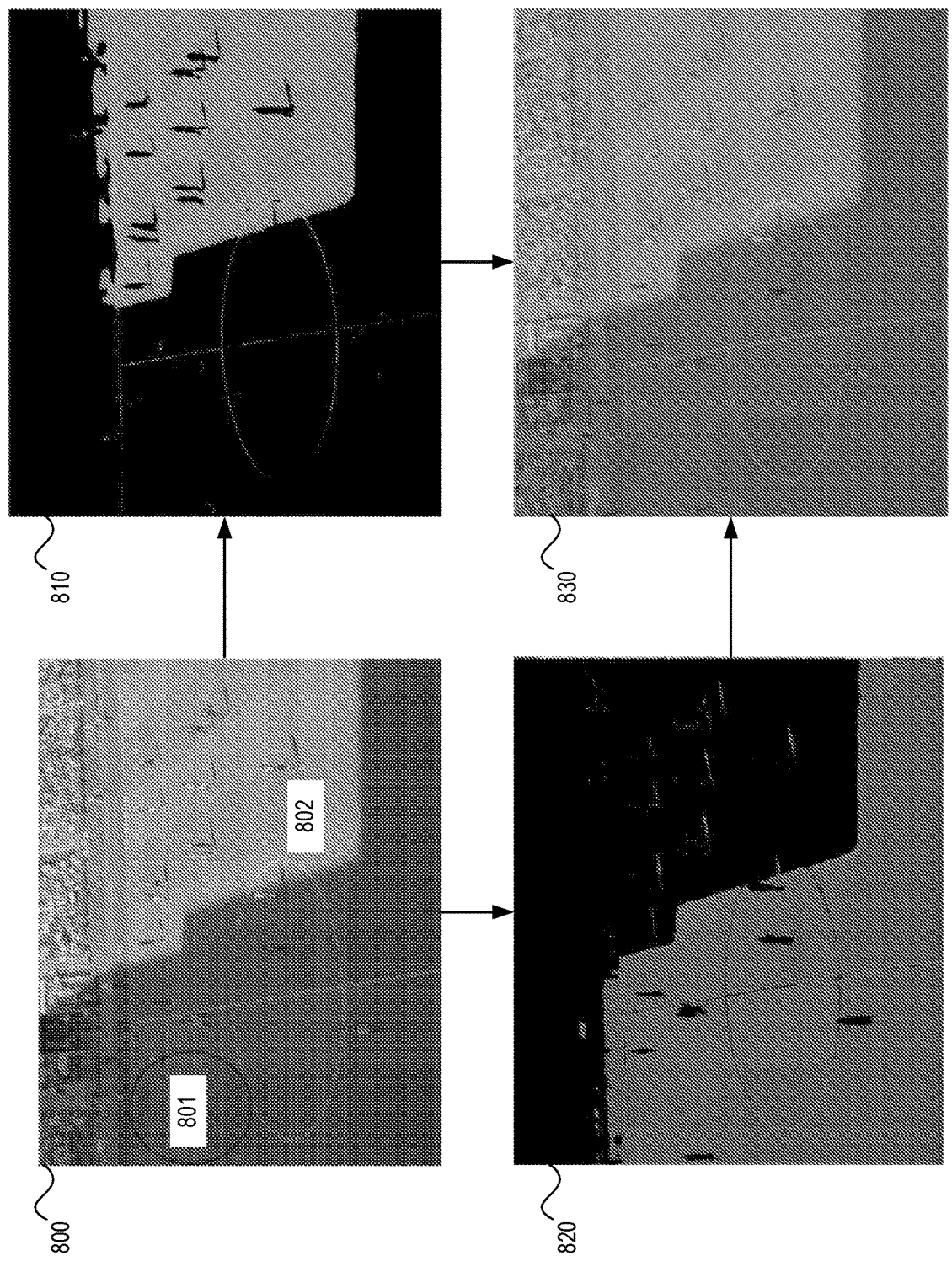

CONTENT-AWARE PQ RANGE ANALYZER AND TONE MAPPING IN LIVE FEEDS

CROSS-REFERENCE TO RELATED APPLICATIONS

This application claims priority to U.S. Provisional Patent Application Ser. No. 62/838,518, filed on Apr. 25, 2019 and EP Patent Application Ser. No. 19171057.3, filed on Apr. 25, 2019, each of which is hereby incorporated by reference in its entirety.

BACKGROUND

This application relates generally to images. More specifically, this application relates to content-awareness in PQ range analysis and tone mapping for live feeds.

As used herein, the term "dynamic range" may relate to a capability of the human visual system to perceive a range of intensity (e.g., luminance, luma, and the like) in an image; for example, the range from darkest blacks ("darks") to brightest whites ("highlights"). In this sense, dynamic range relates to a "scene-referred" intensity. Dynamic range may also relate to the ability of a display device to adequately or appropriately render an intensity range of a particular breadth. In this sense, dynamic range refers to a "display-referred" intensity. Unless a particular sense is explicitly specified to have particular significance at any point in the description herein, it should be inferred that the term may be used in either sense, e.g., interchangeably.

As used herein, the term "high dynamic range" (HDR) relates to a dynamic range breadth that spans the approximately 14-15 orders of magnitude of the human visual system. In practice, the dynamic range over which a human may simultaneously perceive an extensive breadth in intensity range may be comparatively truncated, in relation to HDR. As used herein, the terms "extended dynamic range" (EDR) or "visual dynamic range" (VDR) may individually or interchangeably relate to the dynamic range that is simultaneously perceivable by a human visual system. As used herein, EDR may relate to a dynamic range that spans five to six orders of magnitude. Thus, while EDR may be somewhat narrower in relation to true scene referred HDR, EDR nonetheless represents a wide dynamic range breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support a luminance of 200 to 300 cd/m² ("nits"). Most consumer high-definition televisions ("HDTVs") range from 300 to 1000 nits. Such displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1000 nits to 5000 nits or more).

As used herein, the term "display management" includes, but is not limited to, the processing (e.g., tone and gamut mapping) required to map an input video signal of a first dynamic range (e.g. 1000 nits) to a display of a second dynamic range (e.g., 500 nits).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

BRIEF SUMMARY OF THE DISCLOSURE

Various aspects of the present disclosure relate to circuits, systems, and methods for image processing, including content-awareness in PQ range analysis and tone mapping for live feeds.

In one exemplary aspect of the present disclosure, there is provided an image processing system, comprising: an input configured to receive an image signal, the image signal including a plurality of frames of image data; and a processor configured to automatically determine an image classification based on at least one frame of the plurality of frames, and dynamically generate a mapping metadata based on the image classification, wherein the processor includes: determination circuitry configured to determine a content type for the image signal; segmentation circuitry configured to segment the image data into a plurality of feature item regions, based on the content type; and extraction circuitry configured to extract at least one image aspect value for respective ones of the plurality of feature item regions.

In another exemplary aspect of the present disclosure, there is provided an image processing method comprising: receiving an image signal, the image signal including a plurality of frames of image data; automatically determining an image classification based on at least one frame of the plurality of frames, including: determining a content type for the image signal, segmenting the image data into a plurality of spatial regions, based on the content type, and extracting at least one image aspect value for respective ones of the plurality of spatial regions; and generating a plurality of frames of mapping metadata based on the image classification, wherein respective ones of the plurality of frames of mapping metadata correspond to respective ones of the plurality of frames of image data.

In yet another exemplary aspect of the present disclosure, there is provided a non-transitory computer-readable medium storing instructions that, when executed by a processor of an image processing system, cause the image processing system to perform operations comprising: receiving an image signal, the image signal including a plurality of frames of image data; automatically determining an image classification based on at least one frame of the plurality of frames, including: determining a content type for the image signal, segmenting the image data into a plurality of spatial regions, based on the content type, and extracting at least one image aspect value for respective ones of the plurality of spatial regions; and dynamically generating a mapping metadata based on the image classification on a frame-by-frame basis.

In this manner, various aspects of the present disclosure provide for improvements in at least the technical fields of image processing, as well as the related technical fields of image capture, encoding, and broadcast.

DESCRIPTION OF THE DRAWINGS

These and other more detailed and specific features of various aspects of the present disclosure are more fully disclosed in the following description, reference being had to the accompanying drawings, in which:

FIG. 8 illustrates another exemplary scene in accordance with various aspects of the present disclosure.

DETAILED DESCRIPTION

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

This disclosure can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

Video capture, analysis, and encoding are described herein. In the following description, numerous details are set forth, such as circuit configurations, timings, circuit operations, and the like, in order to provide an understanding of one or more aspects of the present disclosure. It will be readily apparent to one skilled in the art that these specific details are merely exemplary and not intended to limit the scope of this application. For example, in some instances various aspects of the present disclosure may be practiced without these details. In other instances, well-known structures and devices may not be described in exhaustive detail, in order to avoid unnecessarily occluding, obscuring, or obfuscating the present invention.

Overview

Examples described herein relate to image processing, including the generation of metadata during a live broadcast of a video stream. Some examples described herein are usable with the "Dolby Vision" architecture. Dolby Vision for consumer applications is an end-to-end technology suite that enables the creation and distribution of content mastered with a high dynamic range and wide color gamut. Dolby Vision display management matches the capability of a given television (which may only be capable of displaying SDR images) by using a series of algorithms to map the signal to any Dolby Vision consumer television. In displaying HDR content on an SDR display, the HDR images are mapped to the comparatively-reduced dynamic range of the display.

Figure 1:
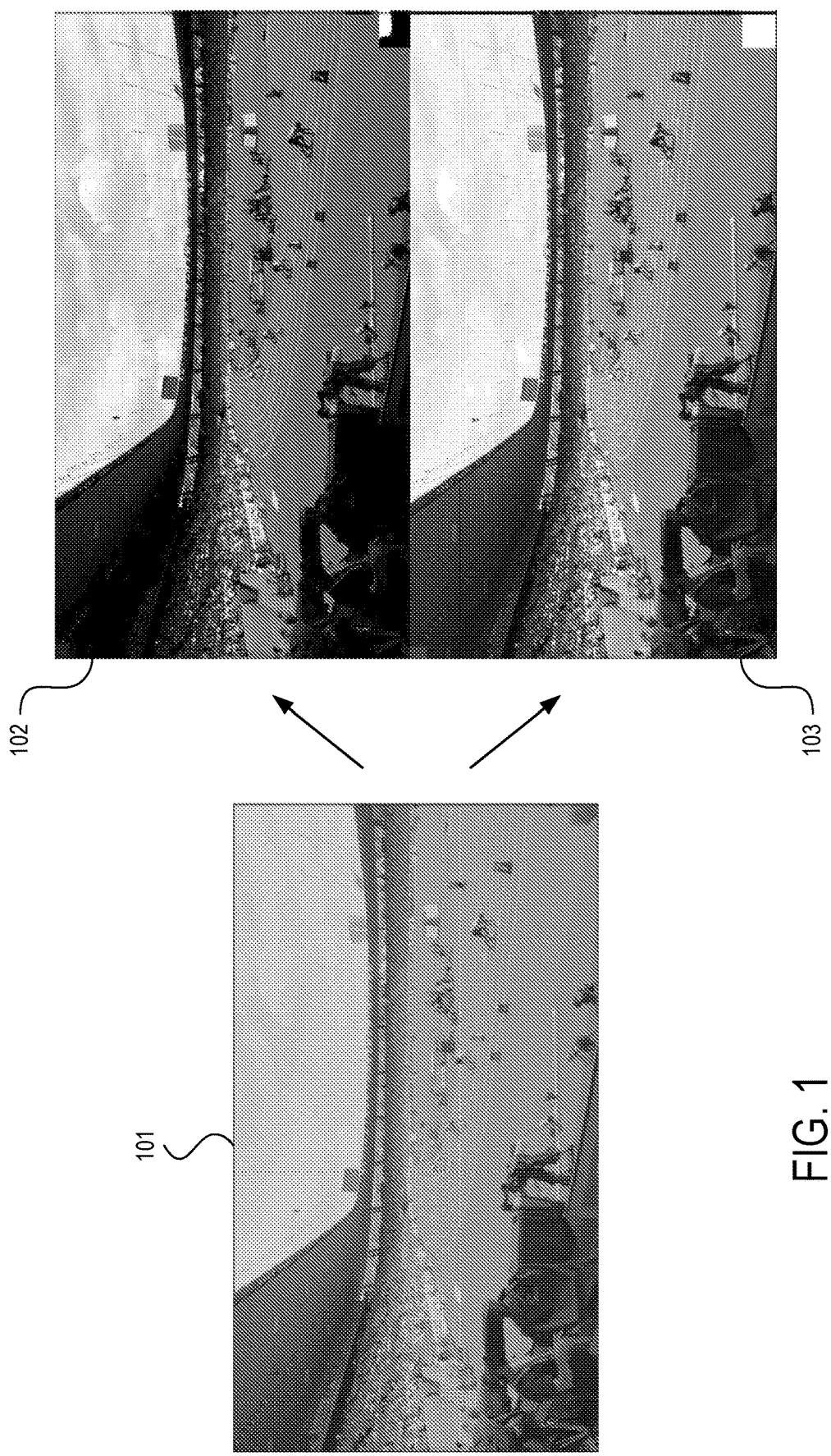
FIG. 1 illustrates a source scene and various rendered scenes according to various aspects of the present disclosure.

FIG. 1 illustrates an example of mapping from a source scene to various rendered scenes. As illustrated in FIG. 1, an HDR image 101 depicts the source scene with both darks (e.g., areas in the lower left and upper left of the HDR image 101) and highlights (e.g., areas in the upper mid and upper right of the HDR image 101). When mapping the HDR image 101 to faithfully display the highlights on an SDR display, an underexposed image 102 may be created as the rendered scene. In the underexposed image 102, the highlights are accurately reproduced but detail is reduced or lost in areas corresponding to darks. Conversely, when mapping the HDR image 101 to faithfully display the darks on the SDR display, an overexposed image 103 may be created as the rendered scene. In the overexposed image 103, the darks are now accurately reproduced but areas corresponding to the highlights may appear washed out. In order to present a converted image that is neither underexposed nor overexposed, metadata (that is, data relating to the image data) may be utilized to determine which features of the HDR image 101 should be considered focus areas of the image.

Figure 2:
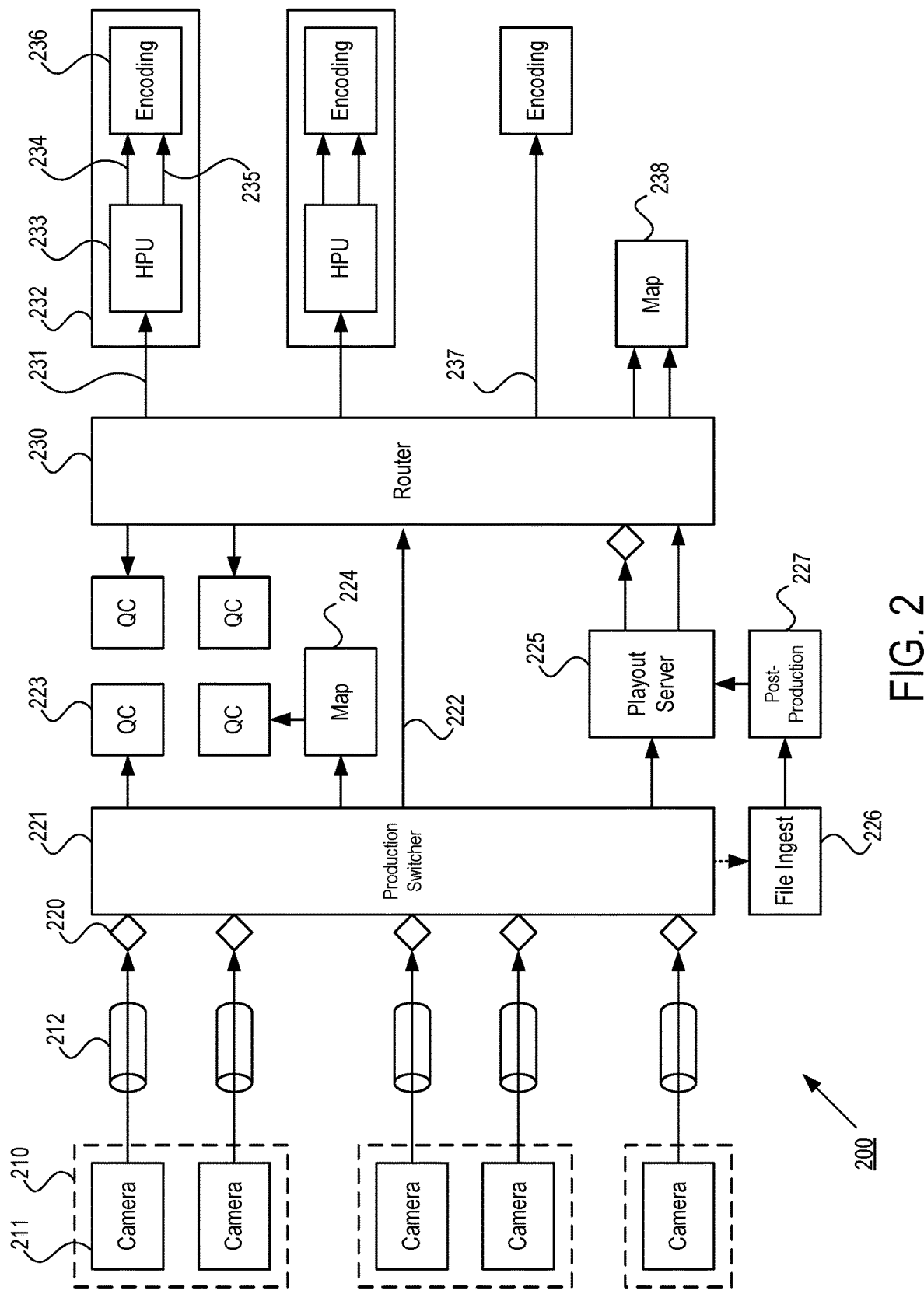
FIG. 2 illustrates a block diagram of an exemplary broadcast workflow according to various aspects of the present disclosure.

FIG. 2 illustrates an example of a broadcast workflow system 200, including video capture, production and post-production, and live distribution. Video capture may be accomplished by one or more camera banks 210, each of which includes one or more cameras 211. Individual camera banks 210 may be located at different physical locations to capture different video content. For example, if the broadcast workflow system 200 is used for a live sports broadcast, a first camera bank 210 may be positioned to capture video of the sporting event itself, a second camera bank 210 may be positioned to capture video of a broadcast booth, a third camera bank 210 may be positioned to capture video of analysts in a studio, and the like. Each camera bank 210 may include any number of cameras 211. Individual cameras 211 may be capable of capturing HDR video data or SDR video data. Video data captured by a given camera 211 passes through a corresponding contribution link 212 for further processing.

As illustrated in FIG. 2, video data passing through a contribution link 212 is received at a corresponding input converter 220. Where the video data is HDR video data, the input converter 220 may perform HDR-to-HDR conversion; for example, conversion from Hybrid Log-Gamma (HLG) or SLog-3 HDR to Perceptual Quantizer (PQ) HDR, for example, as described in Rec. ITU-R BT. 2100-1 (June 2017), *"Image parameter values for high dynamic range television for use in production and international programme exchange."*

Where the video data is SDR video data, the input converter 220 may perform SDR-to-HDR conversion. While FIG. 2 illustrates an input converter 220 for each contribution link 212, in practice fewer input converters 220 may be present. For example, where the video data is HDR video data using PQ, no conversion may occur and thus no input converter 220 may be provided. In either case, video data is provided to a production switcher 221.

The production switcher 221 receives video data from each of the cameras 211 and provides several outputs, including: a broadcast stream 222, which may correspond to video data received from a selected one of the cameras 211; an output to a quality control (QC) unit 223; an output to a mapping unit 224, which may in turn provide an output to an SDR-capable QC unit 223; an output to a playout server 225; and a file ingest 226 for storage. Data from the file ingest 226 may be subject to further processing in a post-production unit 227 and subsequently provided to the playout server 225. Video data stored in the playout server 225 may be utilized for playback at a later time, such as for instant replay or halftime/intermission analysis. The output of the playout server 225 may include SDR video data (in which case conversion may be performed via another input converter 220), HDR video data, or both.

For live distribution, the broadcast stream 222 and/or data from the playout server 225 are received at a router 230. The router 230 provides several outputs, including: one or more outputs (HDR and/or SDR) to QC units 223; one or more HDR distribution streams 231, each to a respective broadcast encoder 232; one or more SDR distribution streams 237 (e.g., an SDR simulcast); and HDR and/or SDR output to a mapping unit 238. The respective broadcast encoder 232 includes an HDR processing unit (HPU) 233 that receives the HDR distribution stream 231, performs various analysis as will be described in more detail below, and outputs an HDR video feed 234 and a metadata feed 235. The HDR video feed 234 and the metadata feed 235 are provided to an encoding unit 236 for encoding and broadcast. The SDR distribution stream 237, if present, may be output directly to an encoding unit 236 without the generation of a metadata feed 235.

HDR Processing

Figure 3:
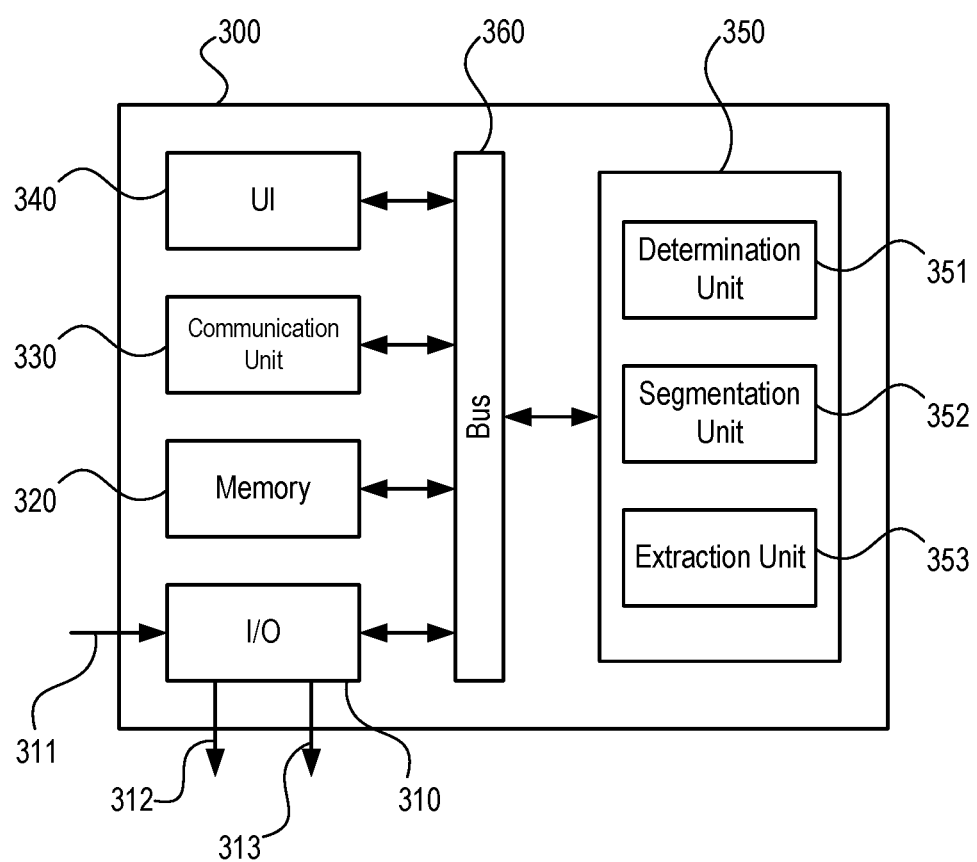
FIG. 3 illustrates a block diagram of an exemplary processing unit according to various aspects of the present disclosure.

FIG. 3 illustrates an exemplary image processing system according to various aspects of the present disclosure. Specifically, FIG. 3 illustrates an HPU 300, which may be an example of the HPU 233 illustrated in FIG. 2. The HPU 300 includes an input/output (I/O) unit 310, a memory 320, a communication unit 330, a user interface (UI) 340, and a processor 350. Various elements of the HPU 300 communicate with one another via a bus 360. The I/O unit receives input data 311, which may be an example of the HDR distribution stream 231 illustrated in FIG. 2, and outputs a video feed 312 and a metadata feed 313, which may be examples of the HDR video feed 234 and the metadata feed 235 respectively illustrated in FIG. 2. The processor 350 includes a determination unit 351, a segmentation unit 352, and an extraction unit 353, each of which will be described in more detail below.

Individual components of the HPU 300 may be implemented as hardware, software, firmware, or combinations thereof. For example, various units may be implemented as circuits or circuitry, may be implemented as software modules in memory or algorithms in a processor, etc., including combinations of circuitry and software modules.

The I/O unit 310 may include one or more ports for inputting or outputting data via a wire, an optical fiber, a wireless communication protocol, or combinations thereof. The memory 320 may be a volatile memory unit or a non-volatile memory unit, including but not limited to Read-Only Memory (ROM) or Random-Access Memory (RAM) such as a hard disk, a flash storage, and the like. The communication unit 330 may include circuitry for receiving control signals or other communication from external to the HPU 300 via a wire, an optical fiber, a wireless communication protocol, or combinations thereof. The UI 340 may include devices or ports for receiving instructions from and/or communicating with a local user, such as a mouse, a keyboard, a touchscreen interface, a display, a graphical UI (GUI), and the like.

Various components of the HPU 300, including but not limited to the processor 350, may be implemented with a computer system, systems configured in electronic circuitry and components, and integrated circuit (IC) device such as a microcontroller, a central processing unit (CPU), a graphics processing unit (GPU), a field programmable gate array (FPGA), another configurable or programmable logic device (PLD), a discrete time or digital signal processor (DSP), an application specific IC (ASIC), and the like. In one example, the determination unit 351, the segmentation unit 352, and the extraction unit 353 may be implemented as circuitry within the processor 350. In another example, the determination unit 351, the segmentation unit 352, and the extraction unit 353 may be implemented as software modules within the processor 350. Various ones of the determination unit 351, the segmentation unit 352, and the extraction unit 353 may share circuit components, algorithms, and/or subroutines with one another.

Figure 4:
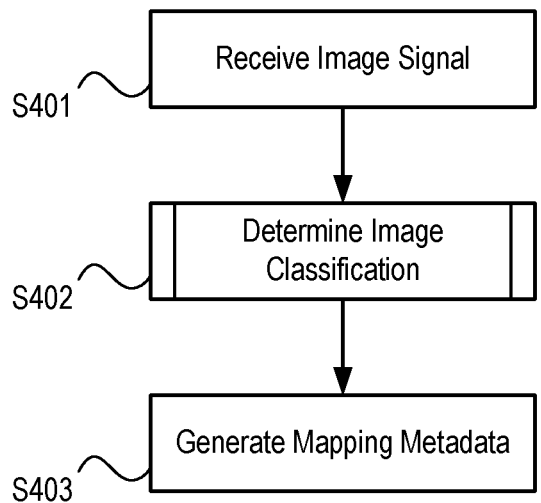
FIG. 4 illustrates a process flow for an exemplary processing method according to various aspects of the present disclosure.
Figure 5:
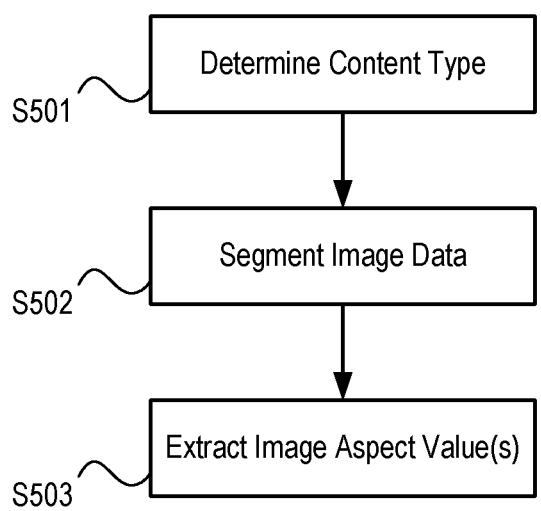
FIG. 5 illustrates a process flow for an exemplary classification method according to various aspects of the present disclosure.

An example of an image processing method implemented by the HPU 300 is illustrated in FIGS. 4-5. In step S401, the HPU 300 receives an image signal; for example, via the I/O unit 310. The image signal includes a plurality of frames of image data, and may correspond to a live video feed. In step S401, the HPU 300 automatically determines an image classification based on at least one frame of the plurality of frames of image data included in the image signal. The determination may include a series of sub-processes, as illustrated in FIG. 5. For example, at step S501 the HPU 300 determines a content type for the image signal, at step S502 the HPU 300 segments the image data into a plurality of feature item regions based on the determined content type, and at step S503 the HPU 300 extracts at least one image aspect value for respective ones of the plurality of feature item regions. The image classification may be performed by the processor 350, such that content type determination of step S501 may be performed by the determination unit 351, the image data segmentation of step S502 may be performed by the segmentation unit 352, and the image aspect value extraction of step S503 may be performed by the extraction unit 353. As can be clearly understood and appreciated by the skilled person, an image classification may generally involve, but is not limited to, assigning (e.g., by labeling or segmenting) images into a number of (e.g., predefined) categories and/or a single image into a number of regions (e.g., based on contents within the image). In particular, such assignment or categorization may be performed based on any suitable criteria and/or conditions using any suitable manner, depending on various implementations and/or requirements. For instance, the assignment or categorization may be achieved based on content types determined from respective images. Thus, in the present disclosure the series of sub-processes/sub-routines S501-S503 may be collectively seen and referred to as an image classification process/ algorithm, or in short, an image classification. Based on the image classification, at step S403 (see FIG. 4) the HPU 300 generates a mapping metadata for output; for example, via the I/O unit 310.

Mapping Metadata Generation and Use

Figure 6:
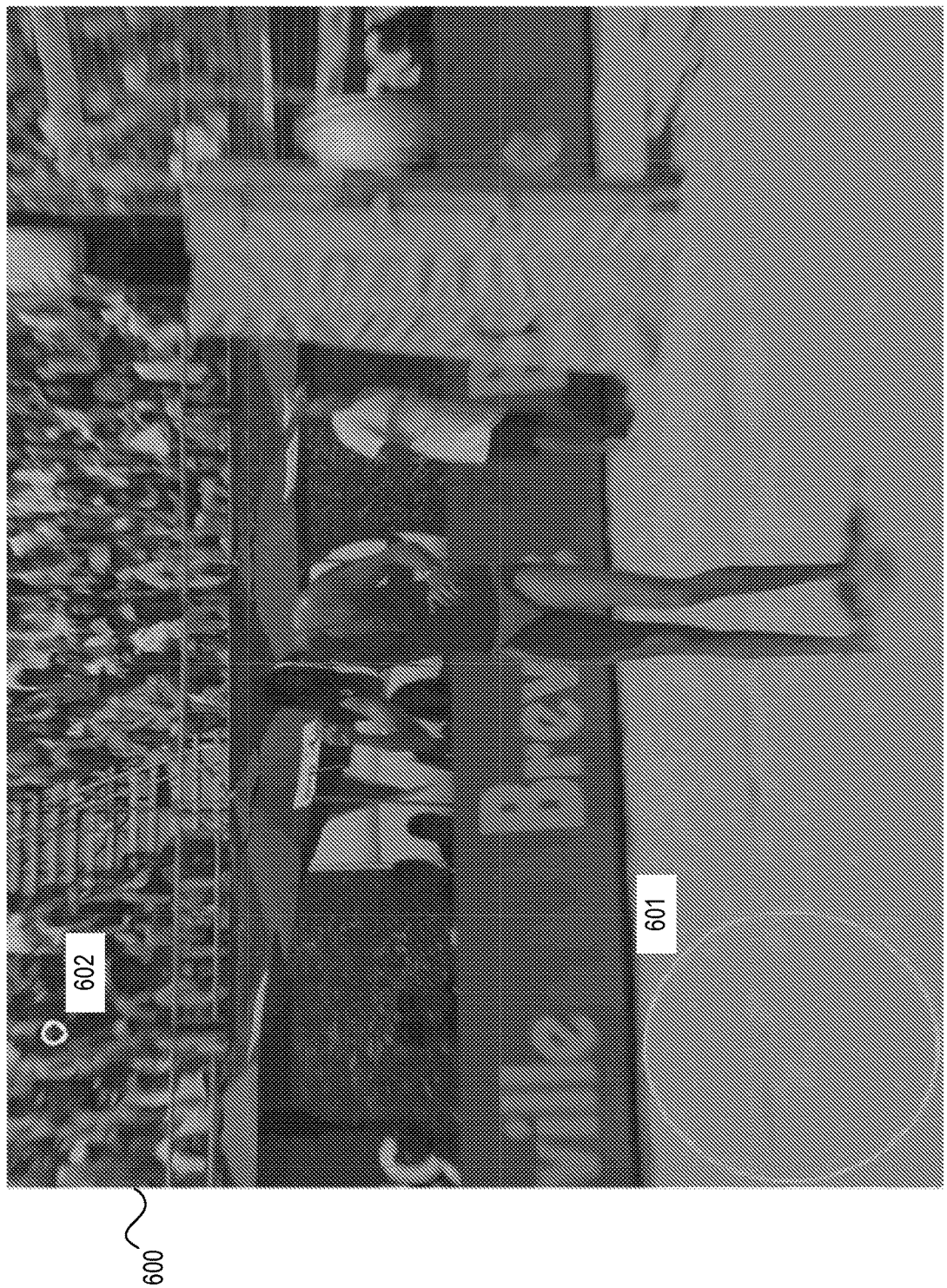
FIG. 6 illustrates an exemplary scene in accordance with various aspects of the present disclosure.
Figure 7:
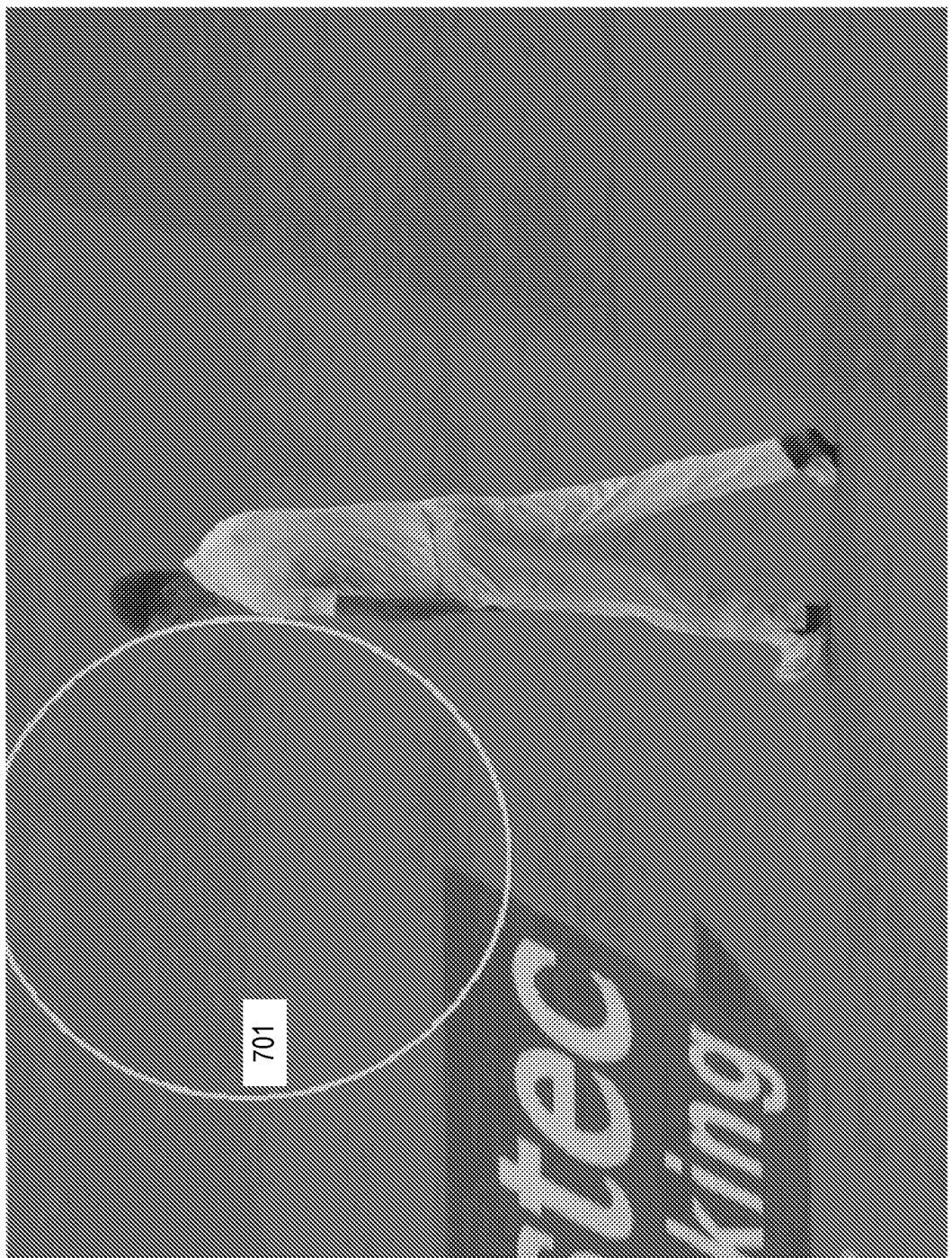
FIG. 7 illustrates another exemplary scene in accordance with various aspects of the present disclosure.

These methods will be described in more detail with reference made to FIGS. 6-8, which illustrate exemplary scenes. Specifically, FIGS. 6-8 illustrate examples of individual frames of image data, which may be frames of the HDR distribution stream 232 and/or the input data 311. FIG. 6 illustrates a frame 600, in which the content type is beach volleyball. FIG. 7 illustrates a frame 700, in which the content type is cricket. FIG. 8 illustrates a frame 800, in which the content type is soccer (association football). While the content types of FIGS. 6-8 are related to live sports, the present disclosure is not so limited. For example, the content type may be live sports, movies, news programs, nature scenes, and the like.

Upon receiving a frame (or multiple frames) of image data, such as the frames 600, 700, or 800, an image processing system determines an image classification. This may be one example of step S402 illustrated in FIG. 4, and may be performed by the HPU 300 illustrated in FIG. 3. In determining the image classification, the image processing system determines the content type, which may be one example of step S501 illustrated in FIG. 5.

The content type may be determined by analyzing various regions of the image frame and determining one or more confidence regions. For example, the image processing system may analyze the image frame 600 and determine that the large portion having a comparatively beige color is a confidence region 601, and that the confidence region 601 likely corresponds to sand. The image processing system may further determine that the top portion of the image frame 600 includes a confidence region 602, and that the confidence region 602 likely corresponds to a face. Similarly, the image processing system may analyze the image frame 700 and determine that the large green portion is a confidence region 701, and that the confidence region 701 likely corresponds to grass. The image processing system may also differentiate between different shades of the same color. For example, as illustrated in FIG. 8, the image processing system may analyze the image frame 800 and determine that the left portion includes one confidence region 801 and the right portion includes another confidence region 802. While the image processing system may determine that confidence regions 801 and 802 both likely correspond to grass, the image processing system may differentiate between the shadowed grass of the confidence region 801 and the sunlit grass of the confidence region 802. While FIGS. 6-8 illustrate the respective confidence regions as circular, in practice a confidence region may be elliptical, rectangular, or any other shape.

Based on the confidence regions, the image processing system may generate a ranked or unranked list of potential content types. For example, in FIG. 6 the image processing system may determine that there is an 85% chance that the image frame 600 shows beach volleyball, a 12% chance that the image frame 600 shows beach soccer, a 4% chance that the image frame shows beach tennis, and the like. This determination may be based on a single frame of image data, a series of consecutive frames of image data, or a series of non-consecutive frames of image data (e.g., every fourth frame). The determination may be performed repeatedly throughout broadcast, such as every ten frames, every thirty seconds, and the like.

Once the content type has been determined, the image processing system segments the image data into one or more feature item regions. This may be one example of step S502 illustrated in FIG. 5. The segmentation may be based on the content type itself; for example, the image processing system may determine an ordered set of priority items in the image data to search and segment for. In the beach volleyball example illustrated in FIG. 6, the image processing system may search and segment first for a sand feature item region, then for a crowd feature item region based on the presence of multiple faces in close proximity, and so on. In the cricket example illustrated in FIG. 7, similarly, the image processing system may search and segment first for a grass feature item region, then for players of a first team based on a jersey color, and so on. Segmentation may also be based on color or tone; for example, in the soccer example illustrated in FIG. 8, the image processing system may search and segment for a shadowed grass feature item region, a sunlit grass feature item region, and so on. FIG. 8 illustrates the segmentation explicitly, where the image frame 800 is segmented into a first feature item region 810 (sunlit grass) and a second feature item region 820 (shadowed grass). Segmentation may be based on a single frame of image data, a series of consecutive frames of image data, or a series of non-consecutive frames of image data (e.g., every fourth frame). The segmentation may be performed repeatedly throughout broadcast, such as every ten frames, every thirty seconds, and the like. In some aspects of the present disclosure, segmentation occurs more frequently than content type determination. For example, the image processing system may determine a content type every five seconds, whereas the image processing system may segment the image data every half-second.

From the segmented feature item regions, the image processing system may extract at least one image aspect value for respective ones of the feature item regions. This may be one example of step S503 illustrated in FIG. 5. The image aspect values may relate to (but are not limited to) luminance information of the respective feature item regions. For instance, the image aspect values may include, without limitation, a luminance maximum, a luminance minimum, a luminance midpoint, a luminance mean, a luminance variance, and the like. The image aspect values may be represented visually or in memory as a histogram. The distribution of image aspect values may be derived based on the image content (e.g., pixel values, luma values, chroma values, Y values, Cb/Cr values, RGB values, and the like), the scene, the gain/offset/power, and the like. In some aspects of the present disclosure, extraction occurs every time segmentation occurs.

One or more of the routines and sub-routines implemented by the image processing system may be performed automatically. For example, the HPU 300 may utilize a machine learning algorithm such as deep learning. Deep learning, as used herein, refers to a class of machine learning algorithm that uses a cascade of multiple layers of nonlinear processing units for feature extraction and/or transformation. Each successive layer may use the output from the previous layer as an input. Deep learning may learn in a supervised (e.g., classification) and/or unsupervised (e.g., pattern analysis) manner Deep learning may be used to learn multiple levels of representations that respectively correspond to different levels of abstraction, such that the levels form a hierarchy of concepts. Examples of such techniques include the work by D. Tran et al., "*Learning spatiotemporal features with 3d convolutional networks,*" the IEEE International Conference on Computer Vision (ICCV), 2015, pp. 4489-4497, and the work by K. Zhang et al., "*Joint face detection and alignment using multitask cascaded convolutional networks,*" IEEE Signal Processing Letters 23.10, 2016, pp. 1499-1503.

The results of the image classification, including one or more of the determined content type, the feature item regions, and/or the image aspect values, may be used to dynamically generate mapping metadata, such as the metadata feed 235 illustrated in FIG. 2 and/or the metadata feed 313 illustrated in FIG. 3. As will be appreciated by the skilled person, the mapping metadata may be generated using any suitable manner depending on various implementations and/or requirements. For instance, the generation of the mapping metadata may be performed based on some or all of the determined content type, the feature item regions, and/or the image aspect values as illustrated above. Furthermore, the mapping metadata may be generated dynamically along the processing of the input signal. That is to say, upon reception of the input image/video signal (e.g., from a live feed), the mapping metadata may be generated dynamically together with the image classification procedure (or in other words, together with the determination of content type, the feature item regions, and/or the image aspect values), thereby improving the quality, accuracy and efficiency of the image/video when being reproduced while at the same time reducing or even avoiding unnecessary or undesired delay (e.g., during a live broadcast). Broadly speaking, the mapping metadata may be generated in such a manner that it enables or facilitates conversion (e.g., mapping) from an input signal to an output signal. For instance, the input signal and the output signal may have different dynamic ranges. In this case, the conversion may involve converting data (in the input signal) of a first dynamic range to data (in the output signal) of a second dynamic range. In other words, the metadata may be generated for (enabling/facilitating) conversion of image data from a first dynamic range to a second dynamic range (which may be higher or lower than the first dynamic range). As will be appreciated by the skilled person, the conversion may include, but is not limited to, tone and/or gamut mapping. The mapping metadata may include several components or parameters used in downstream image processing. By way of example but not limitation, the present disclosure (in particular the image classification thereof) may recognize a live stream as a soccer game. Then, the present disclosure may decide or select an object priority list as grass regions and (human) faces. Subsequently, it may calculate, per object on the list, the HDR PQ profile features (e.g., average, variance and so on) within those regions. Afterwards, such features may be used to determine the suitable tone mapping curve. A typical case for mapping would be one where an HDR feed ranges from 0.001 nits to 1000 nits, and there is a requirement that it could be possible to map to SDR that is from 0.005 nits to 100 nits. Furthermore, the SDR may be encoded according to the BT.1886 standard. In addition, the requirements may also state that (human) faces should be at approximately 70% of the maximum SDR code value, and that grass should be at 18% of the maximum SDR code value. This may be often said to be 70% IRE and 18% IRE, where IRE refers to the Institute of Radio Engineers, a former professional organization that established operating practices for television. Now, in the present example (of a soccer game), suppose that in the HDR signal, the present disclosure finds that faces may be shaded to 200 nits, and that the grass may be at 40 nits. Then an optimization algorithm can be driven to select parameters for the tone mapping algorithm such that pixels at 200 nits in the HDR will be mapped to 70% of the SDR signal, and that pixels at 40 nits in HDR will be mapped to 18% of the SDR signal. It should be evident to those skilled in the field that additional constraints may be added for the maximum HDR pixel value, and the minimum HDR pixel value, so that these are also mapped to suitable levels in the SDR signal. As illustrated in FIG. 8, the mapping metadata may be used at the point of display (e.g., a commercial television owned by an end-user) to display a rendered image frame 830 that faithfully reproduces the entire image, including both darks and highlights. In one particular example, where the present disclosure is implemented in the Dolby Vision architecture, the mapping metadata may include L1 parameters, L2/L8 parameters, L3 parameters, L4 parameters, L11 parameters, and the like.

L1 metadata provides or describes information about a distribution of luminance values in a source image, a source scene, and the like. As noted above, the distribution of image aspect values may be derived based on the image content (e.g., pixel values, luma values, chroma values, Y values, Cb/Cr values, RGB values, and the like), the scene, and the like. L1 metadata may include quantities representing minimum ("crush"), mid-tone ("mid"), and maximum ("clip") luminance values representative of one or more scenes in the image data.

L2 metadata provides or describes information about video characteristic adjustments that are originated from, or traced back to, adjustments made by a director, a color grader, a video professional, and the like. L2 metadata may be based, at least in part, on processing performed in production and/or post-production, such as by the input converter 220, the production switcher 221, the QC unit 223, the playout server 225, the file ingest 226, and/or the post-production 227, illustrated in FIG. 2. L8 metadata is similar to L2 metadata, and in some cases may be equivalent to L2 metadata (e.g., depending on the respective tone curves). L2 and L8 metadata may be referred to as "trim" parameters, and may be indicative of or related to the gain/offset/power of the image data. L2 metadata may correspond to a first reference display with a particular reference dynamic range.

L3 metadata provides or describes information about video characteristic adjustments that are originated from, or traced back to, adjustments made by a director, a color grader, a video professional, and the like. As compared to L2 metadata, L3 metadata may correspond to a second reference display with a reference dynamic range different from the reference dynamic range of the first reference display. L3 metadata may include, for example, offsets or adjustments from the L1 metadata, including offsets or adjustments to the crush, mid, and/or clip luminance values.

L4 metadata provides or describes information about global dimming operations. L4 metadata may be calculated by an encoder during pre-processing, and may be calculated using RGB color primaries. In one example, the L4 metadata may include data which dictates a global backlight brightness level of a display panel on a per-frame basis. Other generated metadata, such as L11 metadata, may provide or describe information to be used to identify the source of the video data, such as cinematic content, computer game content, sports content, and the like. Such metadata may further provide or describe intended picture settings, such as intended white point, sharpness, and the like.

Taken together, the mapping metadata may include conversion data for converting from a first dynamic range to a second dynamic range that is different from the first dynamic range. In some aspects of the present disclosure, the first dynamic range may be higher than the second dynamic range (e.g., conversion from HDR to SDR). In other aspects of the present disclosure, the second dynamic range may be higher than the first dynamic range (e.g., conversion from SDR to HDR). Referring to FIG. 1, the mapping metadata may be utilized to avoid overexposure or underexposure as in images 102 and 103, respectively. For example, the mapping metadata may be encoded with the image data itself for use in tone mapping by a commercial television owned by an end-user.

Equivalents, Extensions, Alternatives, and Miscellaneous

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Example aspects that relate to video capture, analysis, and broadcast are thus described. In the foregoing specification, aspects of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various examples of the present disclosure may take any one or more of the following enumerated exemplary embodiments (EEEs), which are not claims:

EEE1 An image processing system, comprising: an input configured to receive an image signal, the image signal including a plurality of frames of image data; and a processor configured to automatically determine an image classification based on at least one frame of the plurality of frames, and dynamically generate a mapping metadata based on the image classification, wherein the processor includes: determination circuitry configured to determine a content type for the image signal; segmentation circuitry configured to segment the image data into a plurality of feature item regions, based on the content type; and extraction circuitry configured to extract at least one image aspect value for respective ones of the plurality of feature item regions.

EEE2 The image processing system according to EEE1, wherein the at least one image aspect value includes at least one selected from a luminance maximum, a luminance minimum, a luminance midpoint, a luminance mean, or a luminance variance.

EEE3 The image processing system according to EEE1 or EEE2, wherein the image signal is a live video feed.

EEE4 The image processing system according to any one of EEE1 to EEE3, further comprising an encoder configured to encode the image signal and the mapping metadata.

EEE5 The image processing system according to any one of EEE1 to EEE4, wherein the mapping metadata includes conversion data for converting from a first dynamic range to a second dynamic range that is different than the first dynamic range.

EEE6 The image processing system according to EEE5, wherein the first dynamic range is higher than the second dynamic range.

EEE7 An image processing method comprising: receiving an image signal, the image signal including a plurality of frames of image data; automatically determining an image classification based on at least one frame of the plurality of frames, including: determining a content type for the image signal, segmenting the image data into a plurality of spatial regions, based on the content type, and extracting at least one image aspect value for respective ones of the plurality of spatial regions; and generating a plurality of frames of mapping metadata based on the image classification, wherein respective ones of the plurality of frames of mapping metadata correspond to respective ones of the plurality of frames of image data.

EEE8 The image processing method according to EEE7, wherein the at least one image aspect value includes at least one selected from a luminance maximum, a luminance minimum, a luminance midpoint, a luminance mean, or a luminance variance.

EEE9 The image processing method according to EEE7 or EEE8, wherein a respective feature item region indicates at least one selected from a landscape region, a shadow region, a sky region, a facial detection region, or a crowd region.

EEE10 The image processing method according to any one of EEE7 to EEE9, wherein the image signal is a live video feed.

EEE11 The image processing method according to any one of EEE7 to EEE10, further comprising encoding the image signal and the mapping metadata into a compressed output signal.

EEE12 The image processing method according to any one of EEE7 to EEE11, wherein the mapping metadata includes conversion data for converting from a first dynamic range to a second dynamic range that is different from the first dynamic range.

EEE13 The image processing method according to EEE12, wherein the first dynamic range is higher than the second dynamic range.

EEE14 A non-transitory computer-readable medium storing instructions that, when executed by a processor of an image processing system, cause the image processing system to perform operations comprising: receiving an image signal, the image signal including a plurality of frames of image data; automatically determining an image classification based on at least one frame of the plurality of frames, including: determining a content type for the image signal, segmenting the image data into a plurality of spatial regions, based on the content type, and extracting at least one image aspect value for respective ones of the plurality of spatial regions; and dynamically generating a mapping metadata based on the image classification on a frame-by-frame basis.

EEE15 The non-transitory computer-readable medium according to EEE14, wherein the at least one image aspect value includes at least one selected from a luminance maximum, a luminance minimum, a luminance midpoint, a luminance mean, or a luminance variance.

EEE16 The non-transitory computer-readable medium according to EEE14 or EEE15, wherein a respective feature item region indicates at least one selected from a landscape region, a shadow region, a sky region, a facial detection region, or a crowd region.

EEE17 The non-transitory computer-readable medium according to any one of EEE14 to EEE16, wherein the image signal is a live video feed.

EEE18 The non-transitory computer-readable medium according to any one of EEE14 to EEE17, further comprising encoding the image signal and the mapping metadata.

EEE19 The non-transitory computer-readable medium according to any one of EEE14 to EEE18, wherein the mapping metadata includes conversion data for converting between an HDR signal and an SDR signal.

EEE20 The non-transitory computer-readable medium according to EEE19, wherein the mapping metadata includes conversion data for converting from the HDR signal to the SDR signal.

The invention claimed is:

1. An image processing system, comprising:
   an input configured to receive an image signal, the image signal including a plurality of frames of image data; and
   a processor configured to automatically determine an image classification based on at least one frame of the plurality of frames, and dynamically generate a mapping metadata based on the image classification,
   wherein the processor includes:
      determination circuitry configured to determine a content type for the image signal;
      segmentation circuitry configured to segment the image data into a plurality of feature item regions, based on the content type; and
      extraction circuitry configured to extract at least one image luminance value for respective ones of the plurality of feature item regions,
   wherein the determination circuitry is configured to determine the content type by analyzing regions of the frame and determining one or more confidence regions;
   wherein the determination of the content type involves generating a ranked or unranked list of potential content types based on the one or more confidence regions;
   wherein the segmentation of the image data involves, based on the determined content type, determining an ordered set of priority items in the image data to search and segment for;
   wherein the mapping metadata is dynamically generated based on the content type, the feature item regions, and/or image luminance value; and
   wherein the mapping metadata includes tone and/or gamut mapping data for converting from a first dynamic range to a second dynamic range that is different than the first dynamic range.

2. The image processing system according to claim 1, wherein the at least one image luminance value includes at least one selected from a luminance maximum, a luminance minimum, a luminance midpoint, a luminance mean, or a luminance variance.

3. The image processing system according to claim 1, wherein a respective feature item region indicates at least one selected from a landscape region, a shadow region, a sky region, a facial detection region, or a crowd region.

4. The image processing system according to claim 1, wherein the image signal is a live video feed.

5. The image processing system according to claim 1, further comprising an encoder configured to encode the image signal and the mapping metadata.

6. The image processing system according to claim 1, wherein the first dynamic range is higher than the second dynamic range.

7. An image processing method comprising:
   receiving an image signal, the image signal including a plurality of frames of image data;
   automatically determining an image classification based on at least one frame of the plurality of frames, including:
      determining a content type for the image signal,
      segmenting the image data into a plurality of feature item regions, based on the content type, and
      extracting at least one image luminance value for respective ones of the plurality of feature item regions; and
   generating a plurality of frames of mapping metadata based on the image classification, wherein respective ones of the plurality of frames of mapping metadata correspond to respective ones of the plurality of frames of image data,
   wherein the content type is determined by analyzing regions of the frame and determining one or more confidence regions;
   wherein the determination of the content type involves generating a ranked or unranked list of potential content types based on the one or more confidence regions;
   wherein the segmentation of the image data involves, based on the determined content type, determining an ordered set of priority items in the image data to search and segment for;
   wherein the mapping metadata is dynamically generated based on the content type, the feature item regions, and/or image luminance value; and
   wherein the mapping metadata includes tone and/or gamut mapping data for converting from a first dynamic range to a second dynamic range that is different than the first dynamic range.

8. The image processing method according to claim 7, wherein the at least one image luminance value includes at least one selected from a luminance maximum, a luminance minimum, a luminance midpoint, a luminance mean, or a luminance variance.

9. The image processing method according to claim 7, wherein a respective feature item region indicates at least one selected from a landscape region, a shadow region, a sky region, a facial detection region, or a crowd region.

10. The image processing method according to claim 7, wherein the image signal is a live video feed.

11. The image processing method according to claim 7, further comprising encoding the image signal and the mapping metadata into a compressed output signal.

12. The image processing method according to claim 7, wherein the first dynamic range is higher than the second dynamic range.

13. A non-transitory computer-readable medium storing instructions that, when executed by a processor of an image processing system, cause the image processing system to perform operations comprising:
- receiving an image signal, the image signal including a plurality of frames of image data;
- automatically determining an image classification based on at least one frame of the plurality of frames, including:
  - determining a content type for the image signal,
  - segmenting the image data into a plurality of feature item regions, based on the content type, and
  - extracting at least one image luminance value for respective ones of the plurality of feature item regions; and
- dynamically generating a mapping metadata based on the image classification on a frame-by-frame basis,
- wherein the content type is determined by analyzing regions of the frame and determining one or more confidence regions;
- wherein the determination of the content type involves generating a ranked or unranked list of potential content types based on the one or more confidence regions;
- wherein the segmentation of the image data involves, based on the determined content type, determining an ordered set of priority items in the image data to search and segment for;
- wherein the mapping metadata is dynamically generated based on the content type, the feature item regions, and/or image luminance value; and
- wherein the mapping metadata includes tone and/or gamut mapping data for converting from a first dynamic range to a second dynamic range that is different than the first dynamic range.

14. The non-transitory computer-readable medium according to claim 13, wherein the at least one image luminance value includes at least one selected from a luminance maximum, a luminance minimum, a luminance midpoint, a luminance mean, or a luminance variance.

15. The non-transitory computer-readable medium according to claim 13, wherein a respective feature item region indicates at least one selected from a landscape region, a shadow region, a sky region, a facial detection region, or a crowd region.

16. The non-transitory computer-readable medium according to claim 13, wherein the image signal is a live video feed.

17. The non-transitory computer-readable medium according to claim 13, further comprising encoding the image signal and the mapping metadata.

18. The non-transitory computer-readable medium according to claim 13, wherein the mapping metadata includes conversion data for converting from an HDR signal to an SDR signal.

* * * * *